United States Patent
Edwards

[11] 3,983,888
[45] Oct. 5, 1976

[54] METHOD AND APPARATUS FOR CLEANING CONVEYOR BELTS, WITH INCLINED FLEXIBLE FINGERS

[75] Inventor: Eugene R. Edwards, Redondo Beach, Calif.

[73] Assignee: Omni-Lift, Inc., Salt Lake City, Utah

[22] Filed: Feb. 7, 1975

[21] Appl. No.: 547,866

[52] U.S. Cl. ............................. 134/9; 15/21 D; 15/90; 134/6; 198/494
[51] Int. Cl.² ...................... B08B 1/02; B65G 45/00
[58] Field of Search .................. 134/9, 33, 6, 122 R; 15/21 D, 89, 90, 91, 92, 141 A, 363, 230.16; 198/230; 210/396

[56] References Cited
UNITED STATES PATENTS

| | | | |
|---|---|---|---|
| 602,266 | 4/1898 | Peck | 15/230.16 |
| 1,082,747 | 12/1913 | Herud | 15/91 X |
| 1,239,066 | 9/1917 | Winters | 198/230 |
| 1,247,736 | 11/1917 | Stockard | 198/230 |
| 2,730,113 | 1/1956 | Hadley | 134/9 |

FOREIGN PATENTS OR APPLICATIONS

| | | | |
|---|---|---|---|
| 495,422 | 4/1930 | Germany | 198/230 |

*Primary Examiner*—S. Leon Bashore
*Assistant Examiner*—Richard V. Fisher
*Attorney, Agent, or Firm*—Criddle, Thorpe & Western

[57] ABSTRACT

Apparatus for cleaning conveyor belts includes a cylinder, and drive means for causing the cylinder to rotate. A plurality of fingers extend from and are spaced about the curved exterior surface of the cylinder with the fingers being inclined in a direction opposite the direction of rotation of the cylinder. To clean a conveyor belt, the cylinder is positioned adjacent the surface of the conveyor belt so that the fingers of the cylinder contact or nearly contact the surface of the belt and, as the cylinder is rotated, the fingers are forced outwardly to make greater contact with the surface of the belt. To enhance the cleaning process, the conveyor belt is driven in a direction opposing the direction of movement of the fingers.

9 Claims, 4 Drawing Figures

METHOD AND APPARATUS FOR CLEANING CONVEYOR BELTS, WITH INCLINED FLEXIBLE FINGERS

BACKGROUND OF THE INVENTION

Conveyor belts are utilized to transport a variety of materials including coal, ore, broken rock, agricultural debris, metallurigical slurries and even wet concrete. If the efficiency and life of such conveyor belts are to be prolonged, the belts must be cleaned continuously or periodically to remove material which collects or cakes on the conveyor belt surfaces. Prior art arrangements for cleaning conveyor belts typically have involved the use of bristle brushes or scrapers which are placed in contact with the conveyor belt surface to scrape or rub the material from the belt surface. Because the cleaning mechanisms (brush or scraper) are placed in especially close contact with the conveyor belt, the cleaning operation causes wear to the conveyor belt as well as to the cleaning mechanism itself. An even more serious problem with the prior art arrangement is that the cleaning mechanisms tend to fill or "load" with the material or substance being cleaned from the conveyor belt. For example, the bristle brushes used to clean the conveyor belt will fill with the material being cleaned from the belt so that the cleaning effectiveness of the brush is considerably reduced. Scrapers similarly tend to load with the material being cleaned from a belt. Because of the "loading" and rapid wearing, the prior art cleaning mechanisms themselves must be frequently cleaned and replaced.

SUMMARY OF THE INVENTION

It is an object of the present invention to provide a simple, reliable and effective method and apparatus for cleaning conveyor belts.

It is also an object of the present invention to provide such a method and apparatus in which the cleaning mechanism, when operated, contacts the conveyor belt in a manner to effect cleaning thereof but not so as to significantly wear either the conveyor belt or the cleaning mechanism.

It is still another object of the present invention to provide such a method and apparatus in which the cleaning mechanism does not readily load with the material or substance being removed from the conveyor belt.

It is still a further object of the present invention to provide such a method and apparatus which effectively removes either dry, wet or sticky material from a conveyor belt surface.

The above and other objects of the present invention are realized in a specific illustrative embodiment in which an endless belt having a plurality of spaced fingers projecting from one surface thereof is positioned adjacent to the surface of a conveyor belt to be cleaned. The endless belt is then driven so that the finger terminations are forced outwardly to contact and clean material from the conveyor belt surface. In accordance with one aspect of the invention, the fingers on the endless belt are inclined in a direction opposite the direction of travel of the fingers and the conveyor belt being cleaned is driven in a direction opposing the direction of travel of the fingers. This action of driving the conveyor belt and cleaning fingers in opposing directions is especially effective in enhancing the cleaning operation.

BRIEF DESCRIPTION OF THE DRAWING

The above and other objects, features and advantages of the present invention will become more apparent from a consideration of the following detailed description presented in connection with the accompanying drawings in which.

DETAILED DESCRIPTION

Figure 1:
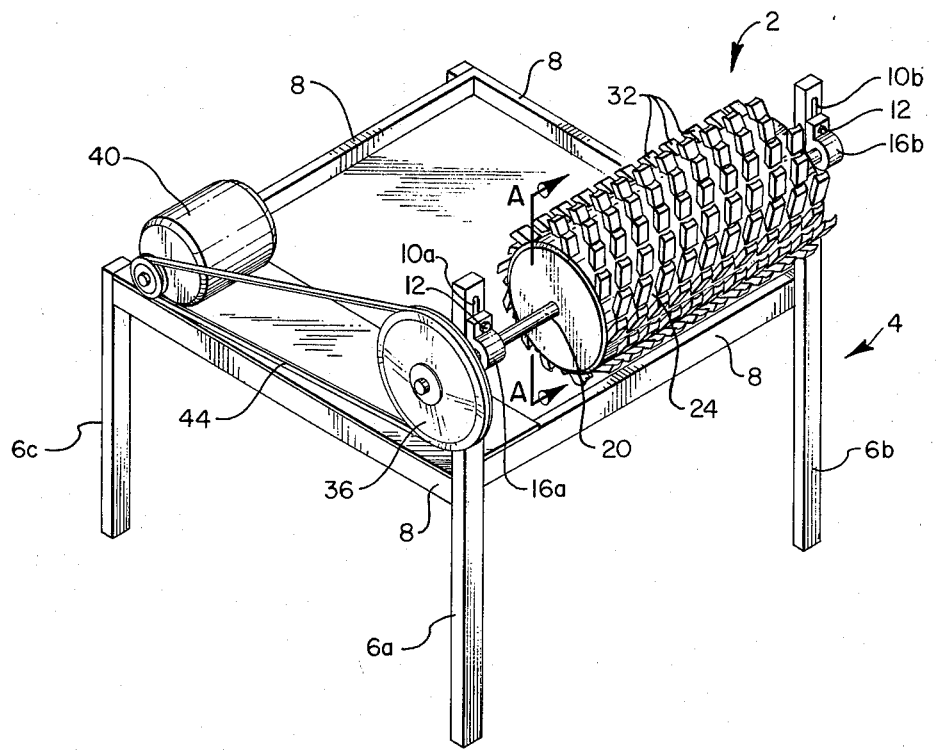
FIG. 1 shows a perspective view of conveyor belt cleaning apparatus made in accordance with the principles of the present invention.

In the embodiment illustrated in FIGS. 1–4, a cylinder 2 is rotatably mounted on a frame 4. The frame 4 includes four legs 6 supporting four rails 8 formed generally into a rectangle as shown. Two of the legs 6a and 6b extend upwardly above the rails 8 to provide a structure on which the cylinder 2 is mounted. The upper portion of each of the legs 6a and 6b includes slots 10a and 10b respectively for receiving bolts 12 which secure bearings 16a and 16b to each of the upper portion of the legs 6a and 6b.

Figure 2:
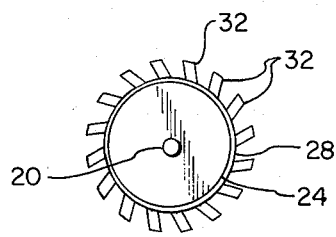
FIG. 2 is a cross-sectional fragmented view of the cylinder of FIG. 1 taken along line A—A.

The cylinder 2 includes an axle 20 journaled in the bearings 16a and 16b, and a pulley or drum 24 mounted on the axle 20. As best seen in FIG. 2, an endless belt 28 is placed about the pulley 24. A plurality of fingers 32 extend upwardly from the exterior surface of the belt 28.

Because of the slots 10a and 10b in the legs 6a and 6b, the bearings 16a and 16b may be positioned on the legs at a variety of distances along the length of the slots 10. This enables the cylinder 2 to be positioned at various distances above ground level to accommodate different conveyor belt frames.

The axle 20 extends through the bearing 16a to enable mounting a pulley 36 on the end of the axle. A motor 40 is mounted on the frame 4 and is positioned to drive the pulley 36 by way of a drive belt 44. When the pulley 36 is rotated, the axle 20 and thus the pulley 24 and belt 28 are also rotated.

It has been found that the process of cleaning conveyor belts with the structure of FIG. 1 is facilitated by the shape and positioning of the fingers 32. As seen in FIG. 2, the fingers 32 are oriented at an incline. As will become clear later on, the fingers 32 are inclined in a direction opposite the direction in which the fingers will be moved to clean a conveyor belt. Illustratively, the fingers may be positioned at an angle of about 60° with the exterior surface of the belt 28. Other angles, more and less than 60°, have also been found suitable however.

The fingers 32 are constructed of a material which allows the tips or terminations of the fingers to move outwardly under centrifugal force as the cylinder 2 is rotated. Illustratively, the fingers 32 and belt 28 are constructed of a resilient rubber.

Figure 3:
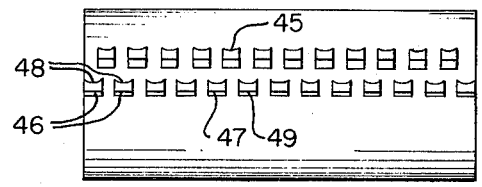
FIG. 3 is a top view of the cylinder of FIG. 1 showing two rows of fingers.

The fingers 32 are shaped to present a generally flat front surface 46 (see FIG. 3 which shows a top view of the cylinder 2) and a generally concave rear surface 48. That is, the surfaces of the fingers lying in the direction of travel of the fingers is generally flat while the surface lying in the direction opposite the direction of travel of the fingers is generally concave. As will next be discussed, this finger construction facilitates cleaning of conveyor belts. The fingers in adjacent rows across the width of the cylinder 2 are offset so that each finger in one row is positioned behind the gap between a corresponding pair of fingers in the row immediately ahead. Thus, for example, finger 45 in FIG. 3 is positioned in back of the gap between fingers 47 and 49. Note also that the width of the fingers is greater than the width of the gaps between fingers.

Figure 4:
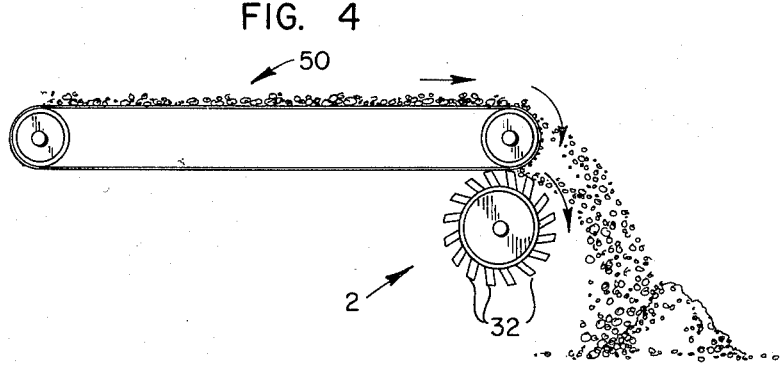
FIG. 4 is a schematic side view of the cylinder of FIG. 1 and a conveyor belt illustrating the method of cleaning conveyor belts in accordance with the present invention.

FIG. 4 shows a conveyor belt 50 and a cylinder 2 positioned to clean the belt. The cylinder 2 is positioned so that when the cylinder 2 is not being rotated, the fingers 32 are positioned very near the surface of the belt 50. Of course, the particular distance at which the fingers are initially positioned next to the belt can be later adjusted to achieve the cleaning effectiveness desired.

After positioning the cylinder 2, the cylinder is caused to rotate in the clockwise direction — direction opposite the direction of incline of the fingers 32 — as shown by the arrow. The conveyor belt 50 is likewise operated in the clockwise direction. This, of course, results in the fingers 32 moving in an opposite direction of the conveyor belt 50 at the point where the fingers and conveyor belt are in closest proximity to each other. As the cylinder 2 is rotated, the fingers 32 flex outwardly, due to the centrifugal force applied thereto, to contact the surface of the conveyor belt 50. The speed of rotation of the cylinder 2 may be selected by the user to achieve the cleaning effectiveness desired.

The configuration and positioning of the fingers 32, the positioning of the cylinder 2 relative to the conveyor 50, and the direction in which the cylinder 2 and conveyor belt 50 are driven during the cleaning operation all cooperate to effectively and rapidly remove either dry or wet material adhering to the conveyor belt. Contact of the fingers 32 with material on the belt 50 together with a lowered air pressure created by movement of the fingers operate to remove matter clinging to the conveyor belt. Air turbulence is created by the front surface of the fingers forcing air against the surface of the conveyor belt 50 and also by the concave surface of the fingers generating a vacuum which operates to "draw" material from the belt. Material which might tend to move toward the endless belt 28 is forced outwardly therefrom by the centrifugal force created by rotation of the cylinder 2 and by the air turbulence created by the cylinder. The incline of the fingers 32 in the direction opposite the direction of rotation of the cylinder 2 also reduces the possibility of material remaining trapped between the fingers and the belt 28.

The cylinder 2 may be positioned and operated to continuously clean a conveyor belt all the while the conveyor belt is being operated to convey materials. It will be noted that with the positioning of apparatus as shown in FIG. 4, the material from the cleaning mechanism will tend to be thrown into the same pile of material into which the conveyor belt is discharging. Thus, the cleaning operation becomes an integral part of the conveying operation.

As indicated earlier, the fingers 32 and belt 28 are advantageously integrally formed of a suitable abrasion resistant rubber or other resilient material. Advantageously, the material from which the fingers and belt are formed is suitably flexible to allow the fingers to bend or deflect if the fingers contact especially hard material caked on the conveyor belt surface. The fingers 32 would then simply bend out of the way to thereby avoid damage to either the cleaning apparatus or the conveyor belt. Because the force of contact between the fingers 32 and conveyor belt surface is caused mainly when the fingers are caused to flex outwardly under centrifugal force as a result of rotation of the cylinder 2, the contact made does not tend to significantly wear either the conveyor belt or the fingers.

It should be understood that other arrangements utilizing the principles of the present invention could be devised by those skilled in the art without departing from the spirit and scope of the invention. For example, an arrangement using a pair of pulleys rather than a single pulley as described above could be provided in which an endless belt with fingers projecting therefrom would pass around both pulleys, the pulleys and belt would then be mounted so that the belt would be driven in a direction opposite the direction of incline of the fingers to clean a conveyor belt generally as described above. Numerous other modifications could also be made and it is intended that the appended claims cover such modifications and arrangements.

What is claimed is:

1. In combination with a conveyor belt, cleaning apparatus comprising
    an endless belt disposed adjacent the conveyor belt and having a plurality of flexible fingers projecting from one surface thereof, said fingers being inclined in a first direction, and
    means for driving said endless belt in a direction opposite said first direction so that said fingers flex outwardly to contact the surface of the conveyor belt.

2. Apparatus as in claim 1 further comprising a pulley about which said endless belt is wrapped so that said fingers extend outwardly therefrom.

3. Apparatus as in claim 1 wherein said endless belt and fingers are integrally formed of a flexible material.

4. In combination with a conveyor belt, cleaning apparatus comprising
    an endless belt disposed adjacent the conveyor belt and having a plurality of flexible fingers projecting from one surface thereof, said fingers being inclined in a first direction, and
    means for driving said endless belt in a direction opposite said first direction so that said fingers flex outwardly to contact the surface of the conveyor belt,
    wherein said fingers include a substantially flat front surface and a substantially concave rear surface.

5. In combination with a conveyor belt, cleaning apparatus comprising
    an endless belt disposed adjacent the conveyor belt and having a plurality of flexible fingers projecting from one surface thereof, said fingers being inclined in a first direction, and
    means for driving said endless belt in a direction opposite said first direction so that the fingers flex outwardly to contact the surface of the conveyor belt,
    wherein said fingers are arranged in rows across the endless belt such that the fingers of each row are positioned behind the gaps between fingers of the preceding row.

6. Apparatus as in claim 5 wherein the width of the fingers is greater than the gap distance between fingers.

7. A method of cleaning conveyor belts comprising the steps of positioning adjacent to the surface of a conveyor belt to be cleaned an endless belt having a plurality of spaced, flexible fingers projecting from one surface thereof, said fingers being inclined relative to said one surface, and driving the endless belt in a direction opposite the direction of incline of the fingers so that the fingers are caused to flex outwardly from said one surface to contact and clean the surface of the conveyor belt.

8. A method as in claim 7 further comprising the step of driving the conveyor belt in a direction opposing the direction of movement of the fingers at the point where the fingers and conveyor belt are in closest proximity to each other.

9. A method as in claim 8 wherein the conveyor belt to be cleaned includes a discharge end from which the material carried by the conveyor belt is discharged onto a discharge pile formed of material conveyed and dischaged by the conveyor belt, said method further comprising the step of positioning the endless belt underneath a conveyor belt at the discharge end thereof so that material removed from the conveyor belt by the fingers of the endless belt is projected toward the discharge pile.

* * * * *